Dec. 1, 1970  M. I. JUNOVICH ET AL  3,544,168

DEVICE FOR LOADING BULK MATERIALS INTO PRESSURE PIPING

Filed April 22, 1968

INVENTORS
MARK IOSIFOVICH JUNOVICH,
NIKOLAI IVANOVICH KAZAKOV

United States Patent Office 3,544,168
Patented Dec. 1, 1970

3,544,168
DEVICE FOR LOADING BULK MATERIALS
INTO PRESSURE PIPING
Mark Iosifovich Junovich, Ust-Kamenogorsk, and Nikolai Ivanovich Kazakov, Leninogorsk, U.S.S.R., assignors to Vsesojuzny nauchno-issledovatelsky gornometallurgishesky institut tsvetnykh metallov, Ust-Kamenogorsk, U.S.S.R.
Filed Apr. 22, 1968, Ser. No. 722,989
Int. Cl. B65g 53/00
U.S. Cl. 302—14                                   5 Claims

ABSTRACT OF THE DISCLOSURE

A device is provided for loading bulk materials into a pressure piping, comprising a lock chamber with an inlet for loading bulk materials and a charging valve at such inlet and a discharge valve at an outlet of the lock chamber to provide communication between the lock chamber and the pressure piping. A compensator is disposed within the lock chamber around a guide tube which is coaxial with the inlet and the compensator is constituted as a variable volume receptacle having resilient walls, adapted to be filled with fluid when the material is being discharged from the lock chamber and to be released from fluid when the material is being loaded thereinto.

---

Figure 1:
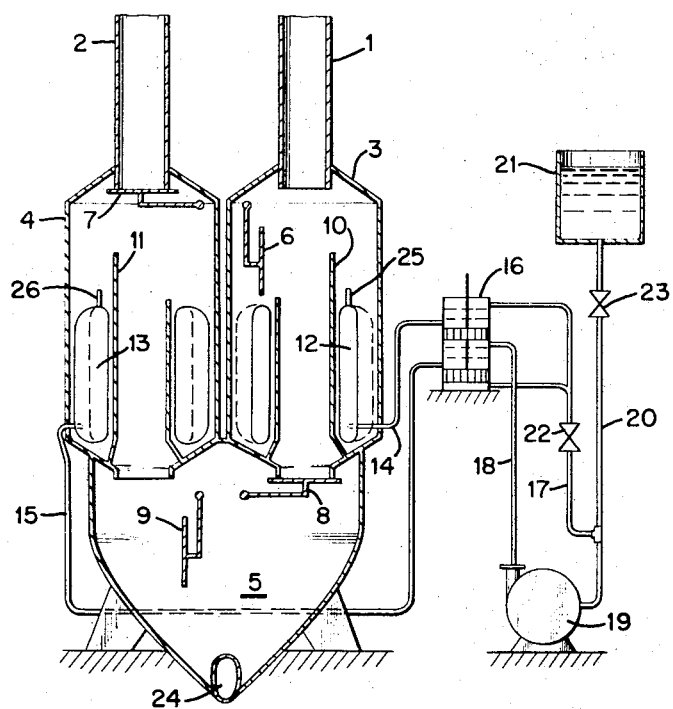

The present invention relates to devices for hydraulic conveying of bulk materials along pipings, and more particularly, to devices for loading bulk materials into a pressure piping.

The invention is applicable, for example, in mining industry for hydraulic conveying bulk materials via pressure pipings (hydraulic lifting of ore minerals from a pit and hydraulic conveying of the same over long distances), in hydromechanical facilities when constructing hydraulic structures, for transferring granulated slag at metallurgical plants or mobile concrete mix and bulk building materials at construction sites, etc.

Known in the present state of the art are loading devices for feeding bulk materials into a pressure water piping. To ensure a continuous loading of the bulk material said devices are made as two lock chambers which communicate with compensators serving as a reservoir for the water displaced from said lock chambers by the bulk material, while the latter is being loaded thereinto. Water removal into the volumetric compensator precludes a counterflow of water, occurring in the charging hole, which decelerates the loading of the bulk materials into the chamber. However, minute and dustlike particles of the material being charged are entrained by the water flowing into the compensator. With the purpose to protect the slide valve and pump against the penetration of said particles through the compensator, the latter is partioned by an elastic membrane into two spaces, one of which communicates with the lock chamber, while the other via the slide valve communicates either with the intake or with the discharge manifold of the pump.

However, the aforementioned device suffers from the following disadvantages inherent therein: low reliability in operation due to damages oftentimes inflected upon the compensator membrane by fast-moving solids; large overall dimensions and weight; rapid wearing out of the pipe elbow connecting the compensator with the lock chamber due to the effect of the minute solids moving therealong.

It is therefore an object of the present invention to eliminate the disadvantages mentioned above and to provide such a device that would ensure its reliable operation when employed to convey coarse-lump, fine and dustlike bulk materials, abrasive ones included.

To ensure reliable operation of the loading device, a well-timed removal of water from the lock chamber should be necessarily carried out when loading bulk material thereinto and its return to that chamber when discharging the bulk material therefrom.

It is likewise necessary that no fine and dustlike particles of the material being handled be entrained by the water outflowing from the lock chamber during loading.

Apart from this, it is essential that the overall dimensions and weight of the device be considerably reduced which is of prime importance in cases where underground work is involved.

All the objects set forth above are achieved by the application of a device comprising at least one lock chamber provided with a charging valve, a discharge valve and a compensator which communicates via a distributor with the intake or discharge manifolds of the pump. Besides, according to the invention, said compensator is made as a variable-volume receptacle with pliable walls and is located within said lock chamber.

In the preferred embodiment of the present invention provision is made for a guide tube to accommodate the material being loaded, said tube being located in the lock chamber coaxially with the charging hole thereof.

The present invention is featured by that said compensator has flexible walls and is made as a circular-shaped reservoir located in a circular space in between the walls of the lock chamber and the guide tube the latter protecting the elastic walls of the compensator from being damaged by the material being handled.

The invention is also characterized in that the elastic wall of the compensator can be made fast on the guide tube.

One more particular feature of the present invention is that provision is therein made for a non-return valve mounted in the top of the compensator and intended to admit air and fluid into the lock chamber from said compensator so as to make up for water losses in the hydroconveying system.

Besides, in case the elastic wall of the compensator is not fixed on the guide tube, according to the invention, provision is made for a flange located at the pipe end which enters the inner space of the compensator, whereas its wall situated oppositely to said flange, is made thickened and is reinforced with a metal plate provided with stop blocks on its surface which blocks prevent an airfast shut-in of the hole in said flange.

The application of the present invention conduces to a higher reliability of operation of the loading device due to the fact that no pliable membrane is made use of in the known compensator, which membrane is liable to destruct readily by the solids moving along with the fluid when pumping the latter out from the lock chamber into the compensator, as well as by making the compensator itself as a receptacle with pliable walls and by its positioning inside said lock chamber.

The utilizing of the present invention makes it possible to load the pressure piping with coarse-lump, finely-crushed and dustlike materials, including abrasive ones.

Furthermore, the use of the present invention allows both the size and weight of the loading device to be reduced drastically which is of great importance from the economic viewpoint when employing the device in mine workings.

Figure 2:
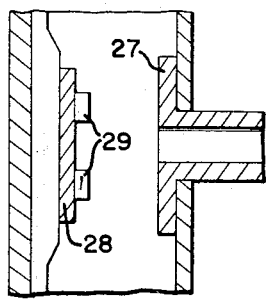

The present invention is further disclosed in an exemplary embodiment thereof to be considered with due reference to the accompanying drawings, wherein:

FIG. 1 is a general diagrammatic view of the loading device, according to the invention; and FIG. 2 illustrates the joint of the piping and the flexible wall of the compensator.

Now referring to FIG. 1, the device disclosed herein comprises charging pipes 1 and 2, as well as lock chambers 3 and 4 arranged above a chamber 5 common to both of them, said lock chambers being provided with charging valves 6, 7 and discharge valves 8, 9 respectively.

Provided inside the chambers 3 and 4 coaxially with the pipes 1 and 2 are guide tubes 10 and 11 serving to accommodate the material being loaded. Arranged in circular spaces in between the walls of the chambers 3 and 4 and those of the guide tubes 10 and 11 respectively, are compensators 12 and 13 with elastic walls, said compensators being made as circular-shaped receptacles. The inner spaces of the compensators 12 and 13 communicate via pipelines 14 and 15 and a distributor 16 with a pipe 17 of the intake manifold of a pump 19 or with a pipe 18 of the discharge manifold thereof. A water supply tank 21 is provided, said tank communicating with the pipe 17 of the intake manifold of the pump 19 via a piping 20; as the water in said tank is being consumed it is replenished from any external source. In the pipes 17 and 20 of the intake manifold of the pump 19 registers 22 and 23 are provided respectively. The bottom chamber 5 communicates with a pressure pipe 24.

The compensators 12 and 13 have their respective nonreturn valves 25 and 26 located at the top thereof and intended to admit water and air to pass from the inner spaces of the compensators 12 and 13 into the lock chambers 3 and 4. The elastic walls of the compensators 12 and 13 may be made fast on the outer walls of the respective guide tubes 10 and 11 by virtue of any of the methods made use of in common practice.

To bring the device into operation the valves 7 and 8 are closed, while the valves 6 and 9 are opened, whereupon water starts flowing along the pressure piping 24 being supplied by the pump of the hydroconveying installation (said pump not appearing in the diagram). As a result the chambers 4 and 5 get filled with water at a high pressure. Concurrently, the tank 21 is likewise filled with water continuously flowing from an external source; with the water registers 22 and 23 opened water is free to flow out of the tank 21 to prime the pump 19 and to fill the pipes 14, 15, 17, 18 and 20.

This done, the register 22 is closed, the distributor 16 is brought to a position indicated in FIG. 1 by a dotted line, the pump 19 starts operating and the compensator 12 is filled with water via the pipes 18 and 14, whereupon the chamber 3 is likewise filled with water through the nonreturn valve 25. After the chamber 3 is filled with water the distributor 16 is brought to a position indicated in FIG. 1, the register 22 is opened and water is forced by the pump 19 via the pipes 18 and 15 into the compensator 13; concurrently water is pumped out from the compensator 12 through the pipes 14 and 17 and from the tank 21 via the pipe 20. Along with pumping out of water from the compensator, the bulk material being handled is loaded through the charging pipe 1 into the guide tube 10 of the lock chamber 3.

When loading a definite volume of the bulk material into the chamber 3, the volume occupied by the compensator 12 is diminished by way of pumping out such an amount of water therefrom that is equal to the volume of the material being loaded. As the water is being fed by the pump 19, the volume occupied by the compensator 13 increases, thus displacing the water from the chamber 4 via the chamber 5 into the pressure piping 24.

The chamber 3 having been loaded with the bulk material being handled, the valves 6 and 9 are closed, the distributor 16 is brought to a position indicated by a dotted line in FIG. 1, whereas the valves 7 and 8 remain closed, since a high pressure precludes them to be turned on. Then the pump 19 starts pumping out water from the compensator 13 via the pipe 17, the distributor 16 and the pipe 15 to force it through the pipe 18, the distributor 16 and the pipe 14 to the compensator 12. This results in the volume of the compensator 13 starting to diminish, whereupon the pressure thereinside and within the chamber 4 drops down to the normal atmospheric level, whereas the volume of the compensator 12 starts increasing and the pressure thereinside and within the chamber 3 rises up to the level within the chamber 5. Now turned on are the valves 7 and 8, whereby the material from the guide tube 10 is bypassed into the chamber 5, and a fresh amount of the material is loaded through the pipe 2 into the guide tube 11 of the lock chamber 4.

Once the loading of the material via the pipe 2 into the guide tube 11 and the material bypass from the tube 10 into the chamber 5 is completed in a procedure similar to that described above, and the compensators 12 and 13 assume the positions indicated by dotted lines in FIG. 1, then the valves 7 and 8 are closed again, the distributor 16 is brought into a position indicated in FIG. 1, and the entire working cycle is repeated as many times as necessary.

The material loaded into the chamber 5 is entrained by a forced water flow passing along the pressure piping 24.

The distributor 16 and the valves 6, 7, 8 and 9 are driven automatically by hydraulic cylinders (not shown in FIGS. 1 and 2).

The capacity of the pump 19 is higher than that of the device described herein with respect to the volume of the bulk material being handled, the amount of the pumped out water is so distributed by the registers 22 and 23 among the compensators 12, 13 and the tank 21 that the volume of water pumped out from the compensators by the pump 19 for a complete cycle is equal to the volume of the bulk material loaded per cycle and assumed as a solid, whereas from the tank 21 is pumped out an additional amount of water necessary to make up for the loss of water due to leakage, evaporation or consumed for wetting the particles of the material being handled. Thus the filling of, say, the compensator 13 with water takes less time than the emptying of the compensator 12.

As the water is being fed by the pump 19, the volume occupied by the compensator 13 increases, thereby displacing the water from the chamber 4 into the chamber 5 and the pressure piping 24. As soon as the volume of the compensator 13 becomes equal to that of the material loaded into the chamber 5, the water pressure inside the former surpasses that inside the chamber 4. Thus the pressure differential so built up causes the nonreturn valve 26 to open, whereby fresh water fed by the pump 19 is free to pass from the compensator 13 to the chamber 4, wherefrom it displaces the water contaminated with the particles of the loaded material, via the chamber 5 into the pressure piping 24.

The walls of the compensators 12 and 13 carry but negligible mechanical loads (of the order of 0.5 kg./sq. cm.) when the nonreturn valves 25 and 26 are being opened and water from the compensators 12 and 13 is passing to the chambers 3 and 4. All the remaining time the pressure on both sides of the compensator walls remains equal.

When flowing out from the compensators 12 and 13 via the nonreturn valves 25 and 26 into the chambers 3 and 4, the water entrains the air incidentally penetrating into said compensators or evolved from the water upon the pressure drop.

When employing the device for loading bulk materials into a pressure piping some cases are likely to occur where a particle of the material being handled is penetrated in between the discharge valves 8 and 9 and their seats. In such cases no airfast disjunction of either of the lock chambers 3 and 4 and the chamber 5 takes place, whereby the pressure inside said chambers 3 or 4 remains at a high level even when the distributor 16 communicates the respective compensator 12 or 13 located in said chamber, with the pipe 17 of the intake manifold of the pump 19. To preclude the walls of the compensators 12 or 13 from bursting, the pipes 14 and 15 are provided with bearing flanges 17 of a required strength, said flanges being located at the intake openings of said pipes inside the compensators 12 and 13, whereas those portions of the walls of the compensators 12 and 13 which are conjugated with said flanges, are made thickened and are reinforced with metal plates 28.

To prevent airfast shut-in of the intake openings of the pipes 14 and 15, provision is made on the metal plates 28 conjugated with the bearing flanges 17, for stop blocks 29 which ensure a necessary gap in between the plates 28 and the flanges 27.

While a preferred embodiment of the present invention has been disclosed in the foregoing description, it will be understood that various modifications and variations may be made without departing from the spirit and scope of the invention.

What is claimed is:

1. A device for loading bulk materials into a pressure piping, said device comprising: at least one lock chamber with an inlet for loading bulk materials thereinto; a charging valve located at the inlet of said lock chamber; a discharge valve on said lock chamber to provide communication between said lock chamber and said pressure piping; a compensator constituted as a variable-volume receptacle inside said lock chamber and having resilient walls, said receptacle being adapted to be filled with fluid when the material is being discharged from said lock chamber and to be released from fluid when the material is being loaded thereinto; a pump having intake and discharge manifolds; a distributor coupled to said pump and to said compensator to alternately connect said compensator with the intake and discharge manifolds of said pump, said lock chamber including a guide tube coaxial with the inlet and adjacent thereto to receive and accommodate the material being handled.

2. A device as claimed in claim 1 wherein said compensator is circular-shaped and located in a circular space between the lock chamber and the guide tube which protects said resilient walls of the compensator against damage by the material being loaded.

3. A device as claimed in claim 1 where said resilient walls of the compensator is made fast on said guide tube.

4. A device as claimed in claim 1 wherein said compensator is provided with a nonreturn valve located in the upper portion thereof adapted to admit air and fluid to pass therefrom into the lock chamber, to compensate for any water losses in a hydroconveying system.

5. A device as claimed in claim 1 comprising a flange in the inner space of the compensator mounted at the end of the pipe therein, the compensator having a wall situated opposite to said flange which is thickened and includes a metal reinforcing plate and stop blocks on said plate to prevent airtight closure of a hole in said flange.

References Cited

UNITED STATES PATENTS

| | | | |
|---|---|---|---|
| 2,943,890 | 7/1960 | Hrabovszky et al. | 302—14 |
| 3,244,455 | 4/1966 | Condolios | 302—14 |
| 3,393,944 | 7/1968 | Reintjes | 302—55 |

ANDRES H. NIELSEN, Primary Examiner

U.S. Cl. X.R.

302—55